US011132473B2

(12) United States Patent
Phinney et al.

(10) Patent No.: US 11,132,473 B2
(45) Date of Patent: Sep. 28, 2021

(54) MANUFACTURING DESIGN MODIFICATION SYSTEM

(71) Applicant: aPriori, Inc., Concord, MA (US)

(72) Inventors: Barton Christopher Phinney, Hudson, MA (US); Karen Beth Gold, Arlington, MA (US); Mark Dignum, Worcester, MA (US)

(73) Assignee: aPriori Technologies, Inc., Concord, MA (US)

( * ) Notice: Subject to any disclaimer, the term of this patent is extended or adjusted under 35 U.S.C. 154(b) by 394 days.

(21) Appl. No.: 16/044,927

(22) Filed: Jul. 25, 2018

(65) Prior Publication Data

US 2019/0065629 A1 Feb. 28, 2019

Related U.S. Application Data

(60) Provisional application No. 62/552,286, filed on Aug. 30, 2017.

(51) Int. Cl.
*G06F 30/00* (2020.01)
*G06T 17/10* (2006.01)
(Continued)

(52) U.S. Cl.
CPC ............. *G06F 30/00* (2020.01); *G06F 30/17* (2020.01); *G06T 17/10* (2013.01); *G06T 19/20* (2013.01);
(Continued)

(58) Field of Classification Search
CPC ...... G06F 30/00; G06F 30/17; G06F 2119/18; G06T 17/10; G06T 19/20; G06T 2219/2021
(Continued)

(56) References Cited

U.S. PATENT DOCUMENTS 7,065,420 B1 6/2006 Philpott et al.
8,706,283 B2 * 4/2014 Wang ...................... G06F 30/20
700/105
(Continued)

FOREIGN PATENT DOCUMENTS

JP 2016536672 A 11/2016
TW I470461 B 1/2015
WO 2015058152 A1 4/2015

OTHER PUBLICATIONS

International Search Report and Written Opinion dated Oct. 17, 2018 which was issued in connection with PCT/US18/47459 which was filed on Aug. 22, 2018.
(Continued)

*Primary Examiner* — Kamini S Shah
*Assistant Examiner* — Faraj Ayoub
(74) *Attorney, Agent, or Firm* — Buckley, Maschoff & Talwalkar LLC

(57) ABSTRACT

Provided are systems and methods for identifying manufacturability improvements to a component prior to the design being provided to a manufacturer. In one example, the method may include receiving an image including a geometric design of a component, receiving an identification of a type of manufacturing process for the component from among a plurality of types of manufacturing processes, recognizing a geometric feature of the component from the image based on the type of manufacturing process, determining a modification to one or more of a size, a shape, and a location of the recognized geometric feature for reducing manufacturing complexity, and displaying, via a user interface, a suggestion for modifying the geometric design of the component based on the determined modification of the recognized geometric feature.

20 Claims, 8 Drawing Sheets

(51) Int. Cl.
*G06T 19/20* (2011.01)
*G06F 30/17* (2020.01)
*G06F 119/18* (2020.01)

(52) U.S. Cl.
CPC .. *G06F 2119/18* (2020.01); *G06T 2219/2021* (2013.01)

(58) Field of Classification Search
USPC ............................................................ 703/1
See application file for complete search history.

(56) References Cited

U.S. PATENT DOCUMENTS

| | | | |
|---|---|---|---|
| 8,914,141 | B2 | 12/2014 | Philpott et al. |
| 9,335,760 | B2 | 5/2016 | Philpott et al. |
| 9,367,063 | B2 * | 6/2016 | Herrman ............ G05B 19/4097 |
| 2007/0038531 | A1 | 2/2007 | Lukis et al. |
| 2014/0347144 | A1 * | 11/2014 | Nath ........................ H01P 1/207 333/100 |
| 2016/0034604 | A1 * | 2/2016 | Lin ........................ G06F 30/00 703/1 |

OTHER PUBLICATIONS

European Search Report and Written Opinion dated Mar. 29, 2021 which was issued in connection with a counterpart application EP 18850399.9.
Regli et. al.: "S I R Institute Research for Systems Research Technicl Research Report Feature Recognition for Manufacturability Analysis Feature Recongition for Manufacturability Analysis Available as ISR TR95-10" Mar. 29, 1994, pp. 1-19 Retrieved from the Internet URL: https://drum.lib.umd.edu/bitstream/handle/1903/5490/TR_94-10.pdf.
Li Ye: "Retrospective Theses and Dissertations: Manufacurablity analysis for non-feature-based objects Recommended Citation", A dissertation submitted to the graduate faculty in partial fulfillment of the requirements for the degree of Doctor of Philosophy Jan. 1 XP055785215, 2008 (Jan. 1, 2008), pp. 1-123, US Retrieved from the Internet.
Japanese Office Action dated Jun. 8, 2021 which was issued in a counterpart application JP 2020-534164.
Indian First Examination Report dated Jul. 15, 2021 which was received in a counterpart Indian application.

* cited by examiner

-- (Continuation of FIG. 2A) --

Process Types 202

- Machined
  - Part: Material, Size, Setup

Features 204

- Holes: Diameter, Tolerances, Accessibility
- Pocket/Slots: Types, Size, Tools
- Gears/Splines: Type, Size, Teeth
- Surfaces: Type/Shape, Tolerances, Roughness, Finish
- Other: Distances, Orientations, etc.

FIG. 4
(User Interface)
400
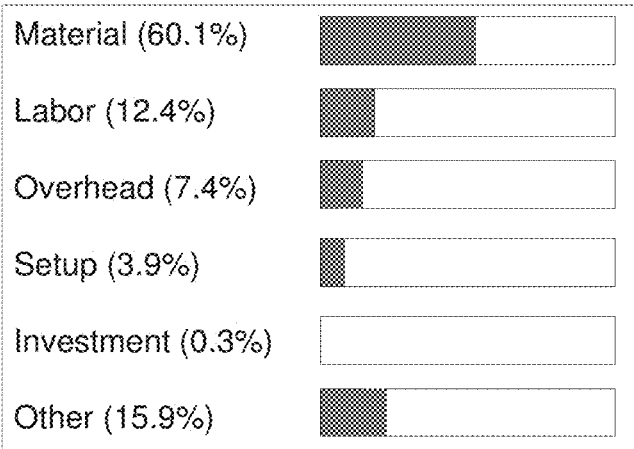
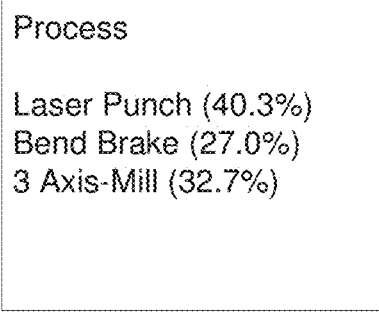

FIG. 5
(User Interface)

500

Bend Issue Details 510

| Sub-Type | GCD | Current | Suggested |
|---|---|---|---|
| Length | Straight Bend | 4.51 mm | > 4.80 mm |

Proximity Issue Details 520

| GCD 1 | GCD 2 | Current | Suggested |
|---|---|---|---|
| Hole 1 | Blank 1 | .030 mm | > 1.27 mm |
| Hole 1 | Straight Bend | 0.620 mm | > 1.90 mm |
| Hole 2 | Blank 1 | .038 mm | > 1.27 mm |

Tolerance Back-Offs 530

| Tolerance | Current | Special | Basic | Process |
|---|---|---|---|---|
| Diam | .010 mm | .040 mm | >= .055 mm | Laser Cut |

# MANUFACTURING DESIGN MODIFICATION SYSTEM

CROSS-REFERENCE TO RELATED APPLICATION(S)

This application claims the benefit under 35 USC § 119(e) of U.S. Provisional Patent Application No. 62/552,286 filed on Aug. 31, 2017, in the United States Patent and Trademark Office, the entire disclosure of which is incorporated herein for all purposes.

BACKGROUND

Computer-aided design (CAD) is a technology by which computers can be used to aid in creating, modifying, and optimizing component design such as manufacturing components and parts. CAD software may use vector-based graphics to depict objects rather than relying on traditional hand drawings. In some cases, CAD software may produce raster graphics showing the overall appearance of designed object. CAD software may involve more than just shapes. For example, the CAD may convey information, such as materials, processes, dimensions, tolerances, or the like, according to application-specific conventions. CAD is an important industrial art used in many applications, including automotive, shipbuilding, aerospace, industrial and architectural design, prosthetics, manufacturing, and many more.

Designers tasked with the responsibility of designing a component to be manufactured are often motivated by how the component is going to perform. A designer may focus on factors that can affect performance such as size, shape, material, and the like. However, the designer may not understand manufacturing complexity of such a design. For example, a one inch hole within a particular shaped component may require three different specialized drilling operations during manufacturing while a half-inch hole in a similar position on the component may require only one standard drilling operation. As another example, a shape of a cut within a piece of sheet metal may not be manufactured due to a thickness of the sheet metal. In this case, the designer may not find out about such a problem until weeks after they have submitted the design for manufacture creating significant delays. Accordingly, what is needed is a system that can aid in reducing manufacturing complexity during the design stage.

SUMMARY

According to an aspect of an example embodiment, a method may include one or more of receiving an image including a geometric design of a component, receiving an identification of a type of manufacturing process for the component from among a plurality of types of manufacturing processes, recognizing a geometric feature of the component from the image based on the type of manufacturing process, determining a modification to one or more of a size, a shape, and a location of the recognized geometric feature for reducing manufacturing complexity, and displaying, via a user interface, a suggestion on how to modify the geometric design of the component based on the determined modification of the recognized geometric feature.

According to an aspect of another example embodiment, a computing system may include one or more of a processor configured to one or more of receive an image including a geometric design of a component, receive an identification of a type of manufacturing process for the component from among a plurality of types of manufacturing processes, recognize a geometric feature of the component from the image based on the type of manufacturing process, and determine a modification to one or more of a size, a shape, and a location of the recognized geometric feature to reduce manufacturing complexity, and an output configured to output, to a user interface, a suggestion on how to modify the geometric design of the component based on the determined modification of the recognized geometric feature.

According to an aspect of another example embodiment, a non-transitory computer readable medium may perform one or more of receiving an image including a geometric design of a component, receiving an identification of a type of manufacturing process for the component from among a plurality of types of manufacturing processes, recognizing a geometric feature of the component from the image based on the type of manufacturing process, determining a modification to one or more of a size, a shape, and a location of the recognized geometric feature for reducing manufacturing complexity, and displaying, via a user interface, a suggestion on how to modify the geometric design of the component based on the determined modification of the recognized geometric feature.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIGS. 2A and 2B are diagrams illustrating features driving complexity of manufacturing design based on process type in accordance with an example embodiment.

FIG. 4 is a diagram illustrating a user interface displaying manufacturing attributes of a component in accordance with an example embodiment.

FIG. 5 is a diagram illustrating a user interface displaying suggested modifications for designing a component in accordance with an example embodiment.

Figure 1:
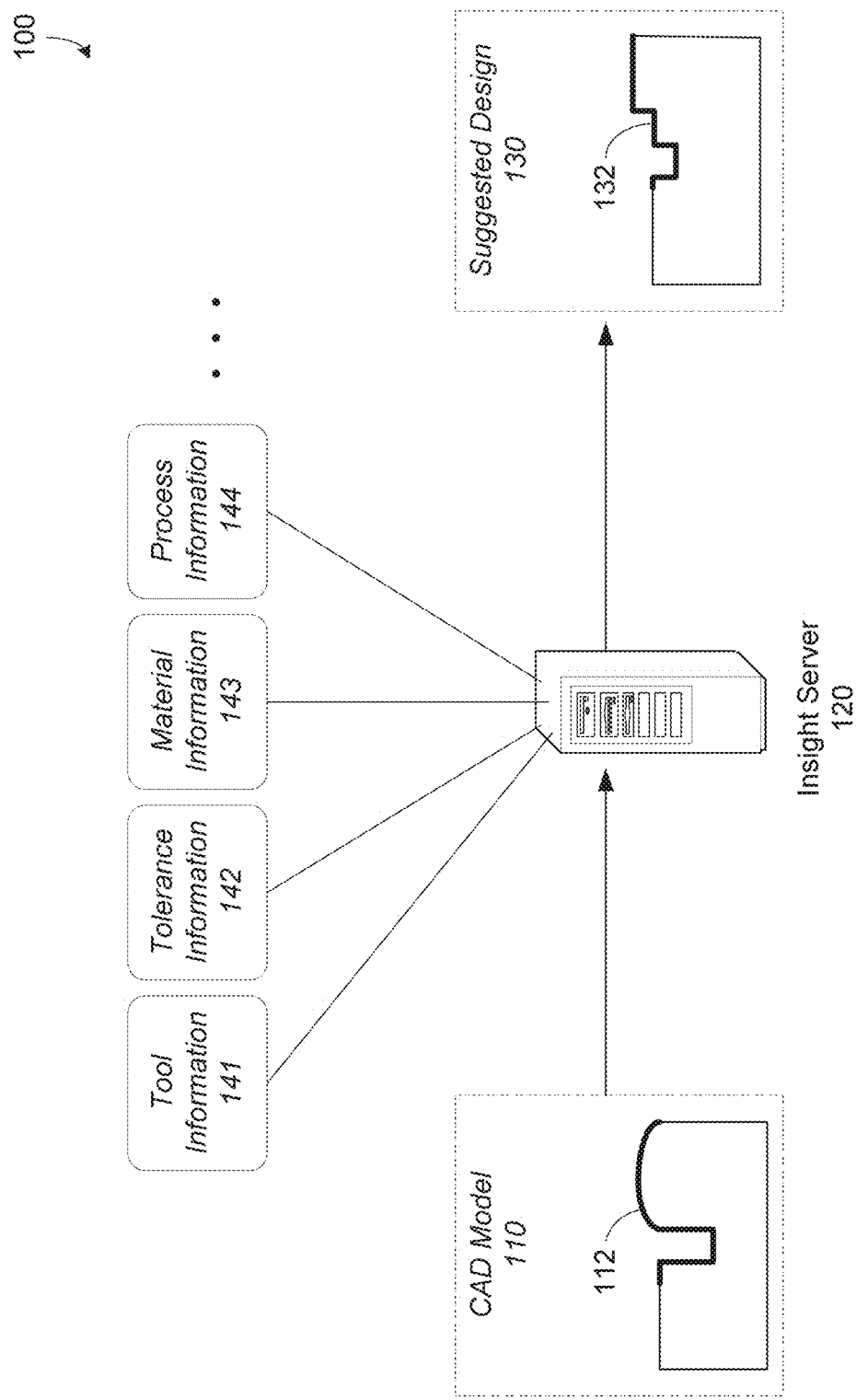
FIG. 1 is a diagram illustrating a system for suggesting modifications to a manufacturing design in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The example embodiments are directed to a system and method that can identify and suggest design modifications to a component thereby reducing manufacturing complexity prior to manufacture. Based on a computer-aided design (CAD) model, CAD file, or other geometric model in graphical format submitted to the system, one or more geometric features of interest can be detected from the CAD model or CAD file and modifications to the geometric feature can be automatically provided to reduce the complexity of manufacture. For example, modifications can be suggested to reduce a number of tools needed, change a specialized tooling process to a basic (standard) tooling process, reduce an amount of manufacturing time, reduce manufacturing cost, and the like. The modifications may include a change in a shape, a size, a location, a depth, a type, and the like, of a geometric feature/design.

The process may be iterative in that multiple suggestions (or rounds of suggestions) are provided to the designer until a most efficient manufacturing design is determined. As another example, the system may detect a component that is not capable of manufacture due to one or more design constraints. In this example, the system can notify the designer of such a flawed design before the design is submitted for manufacture. Furthermore, the system can suggest changes to the design to meet manufacturing requirements. The system also has the ability to process many parts (e.g., 1000 or more) and tell the user which parts to focus their effort on, based on number/magnitude of issues. While related systems may perform a rudimentary geometric analysis, the system described herein may perform a full simulation of the manufacturing process, which allows the results to be more complete and avoid some of the "false alarms."

During a design phase, a designer can generate a technical model such as a CAD model that includes a rendering of the component to be manufactured. In addition to the structural design (geometric shape) of the component, in some cases, the CAD model may include additional attributes such as material types, manufacturing processes, dimensions, tolerances, and the like. The CAD drawing is typically submitted to a manufacturer for manufacturing a quantity of the component.

However, a designer is often unaware of factors that can significantly affect the complexity of the manufacturing of the component. Complexity can create numerous drawbacks such as delays, design flaws, increased manufacturing costs, and the like. For example, a geometric feature such as a cut, a bend, a hole, a shape, etc., may require specialized manufacturing (via specialized tools) rather than basic manufacturing (via basic tools). As another example, a designer may choose a location, a size, a tolerance specification, etc., based on preference without having any understanding that a different location, size, pattern, etc., can be manufactured using a simpler process. Manufacturing complexity can be created by many different factors such as material, manufacturing process, location, size, shape, tolerance, and the like. These features are not uniformly measurable and are not easy to visualize or comprehend by a user reviewing a drawing. Furthermore, a change in one design attribute of the component can create problems in other design attributes of the component.

The system described herein addresses these problems by automatically suggesting changes to a component design to reduce manufacturing complexity of the component. The system may receive a model or a file of a component design (e.g., CAD model, etc.) and extract one or more geometric features of interest. Geometric features include holes, bends, surfaces, distance from other features, accessibility of the feature to a tool approaching from various directions, and the like, which may have attributes such as size, depth, location, shape, and/or the like. The system may perform a mathematical/geometric analysis of the CAD model based on a boundary representation geometry of a part or other item included within the CAD model. The system may analyze a geometric feature of interest and identify one or more changes to the feature that will reduce manufacturing complexity (e.g., time, cost, tools, machining processes, etc.). In some cases, the system can suggest an alternative design that still satisfies the client's goals but that reduces complexity. Suggested modifications may include a different location, different angle, different shape, different depth, different surface, and/or the like.

Furthermore, the system may output suggestions to a user via a user interface during a design of the component. In other words, the suggestions may be provided while the component is being designed (e.g., during CAD creation) thereby making such suggestions prior to the component being manufactured. The system may display feedback about a current manufacturing evaluation of a component and offer ways in which the efficiency can be improved to the user. The system, via the user interface, may guide the user to a more efficient complexity through an iterative process the iteratively provides feedback while the user is changing the design of the product. Furthermore, a user may drill down into manufacturing issues identified by the system and view underlying causes of such manufacturing issues.

Through the design process described herein, the manufacturing complexity may be reduced. Examples of reducing complexity include, but are not limited to, reducing an amount of physical material necessary to make a part, reducing an amount of time to make a part, improving the efficiency of manufacturing, for example, a smaller number of manufacturing processes, least amount of tools to manufacture the component, greater use of basic/standard tools versus specialized tools, and the like. Another attribute that can be modified to reduce complexity of manufacture is the level of tolerance allowed for a geometric design. In some embodiments, the tolerance may be backed off to create a significantly less complex manufacturing process (e.g., fewer tools, basic tooling instead of special tooling, elimination of specialized processes, and the like). As another example, quality-related warnings may be provided including proximity warnings (e.g., in sheet metal, etc.), sharp edges or thickness violations (e.g., plastic, etc.), and the like. Accordingly, the system can be used to improve design for manufacturability and cost (DFMC).

FIG. 1 illustrates a system 100 for providing insights and suggestions to a manufacturing design in accordance with an example embodiment. Referring to FIG. 1, the system 100 includes an insight server 120 that may receive a model 110 of a component to be manufactured from a user device (not shown). For example, the user device may be connected to the insight server 120 through a network such as the Internet.

As another example, the process may be performed by a user device executing the design improvement software described herein without connecting to the insight server 120.

In the example of FIG. 1, the mode 1110 includes an initial design 112 for a hardware component. The initial design 112 includes a geometric shape of the component to be manufactured. The insight server 120 can make suggestions for modifying a design of the component included in the initial design 112 early in the process (i.e., before a component has been sent for manufacture). The insight server 120 can provide suggestions which help reduce manufacturing complexity, and improve manufacturing efficiency. Specialized machining can do certain things more easily but at a greater complexity (e.g., a laser cutter may cut a hole to a certain tolerance, but to go deeper, the cut may require three separate cuts instead of one cut which can increase manufacturing complexity exponentially). The insight server 120 may provide guidance and suggestions on reducing complexity. In addition, the insight server 120 may display estimates on what it would cost to manufacture a certain part, etc.

Certain attributes can be "drivers" of manufacturing complexity including tooling information 141, tolerance information 142, material information 143, process information 144, and the like. The tooling information 141 may provide information about which tools are needed to design geometric features detected from the model 110, for example, whether specialized tools or additional tooling components are needed to manufacture the geometric features detected from the model 110. The tooling information may identify which features need a specialized tooling, a basic tooling, a number of tools, and the like. The tolerance information 142 may provide an identification of achievable tolerance levels versus requested tolerance levels for cuts, holes, bends, and the like. For example, the tolerance information 142 may identify back-off amounts that are necessary to drop from a specialized tooling process to a basic tooling process, etc. The material information 143 may identify an amount and a type of materials necessary to create identified geometric features, and how those materials affect complexity, and the like. The process information 144 may provide complexity information that is different based on types of manufacturing processes (e.g., casting, plastic molding, sheet metal, etc.) to be performed. It should also be appreciated that other information may be helpful in determining complexity and that the types of information shown in FIG. 1 are for purposes of example only.

Complexity can be driven by multiple factors. For example, a feature with tolerances which require a specialized manufacturing process can create significant complexity. As another example, a cutting process may require more time than another type of cutting process but the design may need to be modified in order to perform the speedier cutting process. It's not enough to just know the complexity, but there is also a benefit from understanding what is being obtained from the complexity. The insight server 120 may make one or more suggestions to the design of the component such as suggested design 130 of the component with a suggested geometric modification 132. Although shown as an image, the suggestions may be output through a user interface enabling the user to view the changes numerically. Furthermore, the insight server 120 may iteratively generate suggestions to reduce multiple aspects of complexity until a most efficient component design has been generated.

One or more rules can be made or can be used to disqualify a process. The insight server 120 may analyze a significant amount of manufacturing alternatives and different criteria and methods that might be viable to satisfy a desired outcome (design) of the product being manufactured. For example, the insight server 120 may identify multiple viable design variations and identify a lowest costing design variation, a least time consuming time variation, basic (easiest to manufacture) design variation, and the like. The insight server 120 may make multiple suggestions which are output via the user interface and which enable the designer to make the final choice on how best to proceed. The presence of certain features may create complexity while hindering manufacturing efficiency, and they can include unnecessary tolerances, dimensions that are too large, too small, materials that are not compatible with certain manufacturing processes, and the like. The insight server 120 can identify these problems and suggest alternatives that still satisfy the object of the component being designed. In some cases, the suggested changes are to enable the component to be manufactured. This modification(s) may increase cost but save the complexity down the road.

In some embodiments, the user (e.g., designer) may establish a high level of connection with the insight such as classifying the component as being a machined part, a sheet metal part, a cast part, or the like. The insight server 120 may then identify tools, specialized machining, basic machining, geometric features including attributes such as tolerances, surfaces, bends, holes, locations, sizes, corners, and the like, based on the model 110. Furthermore, the insight server 120 may then make suggestions as to how the to change one or more geometric features of the component as identified from the model 110. Also, it should be appreciate that the designer may input various attributes about the component to be manufactured that may further assist the insight server 120 in identifying and making suggestions. For example, a user interface of the insight server 120 may receive material types, manufacturing types, quantity of manufacture, manufacturing time needed, and the like.

Suggestions made by the insight server 120 may include corrections or other modifications to design to change tooling, change processing, change materials, and the like. For example, a sharp internal corner can't be made with a cylindrical tool very easily and may require a specialized tool which is less available and more expensive. This can be solved by adding a rounded edge. Another example is tolerances which can drive additional manufacturing (specialized manufacturing). Tight tolerances often require specialized finishing. Therefore, a suggestion to back-off a tolerance may eliminate the specialized finishing. Another example, is a change to a size or shape of a geometric feature may reduce the number of tools (and time) needed to manufacture such a design. For example, a hole having a tolerance of $4/1000$ of an inch in sheet metal may require three separate drilling processes, but if the tolerance of the hole is backed-off to $8/1000$ of an inch it may only require one standard drilling process. In many cases, a design feature increasing complexity is not required but is simply because the designer likes the aesthetics of the design. Therefore, suggested modifications may not affect performance of the component.

The insight server 120 may output suggested changes (e.g., suggested design 130 having suggested geometric features 132), to reduce manufacturing complexity and make updates as needed. The user is given the information. Typically, the designer may send their drawing off to manufacturing and a few weeks later, the manufacturer sends it back and says they can't make a certain features/tolerance. However, the system herein can provide corrective measures before a designer has requested manufacturing (e.g., the design phase). Therefore, the user/designer does not have to deal with issues at the time of manufacture. Another benefit of the correction server 120 is the identification and suggestion of tools being used (e.g., standard vs. non-standard), tool count, types of tools, standard vs. non-standard size, and the like. Consolidating tools can reduce cost and complexity (time). For example, requiring only one screw driver instead of four can simplify speed, complexity, time, and cost. For example, the system may suggest that a user consider or otherwise investigate use of a less expensive material.

The type of suggestions/feedback generated by the insight server 120 may be different based on the manufacturing process (e.g., plastic, metal, casting, assembly, etc.) Different materials, processes, machines, geometry features, and the like, may be changed to affect complexity. Some suggested changes can be more costly at first (e.g., to build the mold) but save cost later when making a large quantity of parts based on the mold. There's a series of ways that parts can be manufactured. All of the constraints can be taken care of and give guidance to make it simpler or even possible. Furthermore, the insight server 120 may interpret the geometry of the component in the model 110 in different ways based on the type of process being performed. For example, if the component is a sheet metal, the curve may be a bend, whereas a plastic part may just be a molded edge (not a distinct feature). The insight server 120 assesses the geometry and what it represents and then how it might be manufactured. The correction server 120 may interpret the geometry and group it in a certain way, when providing corrective modifications.

Figure 2A:
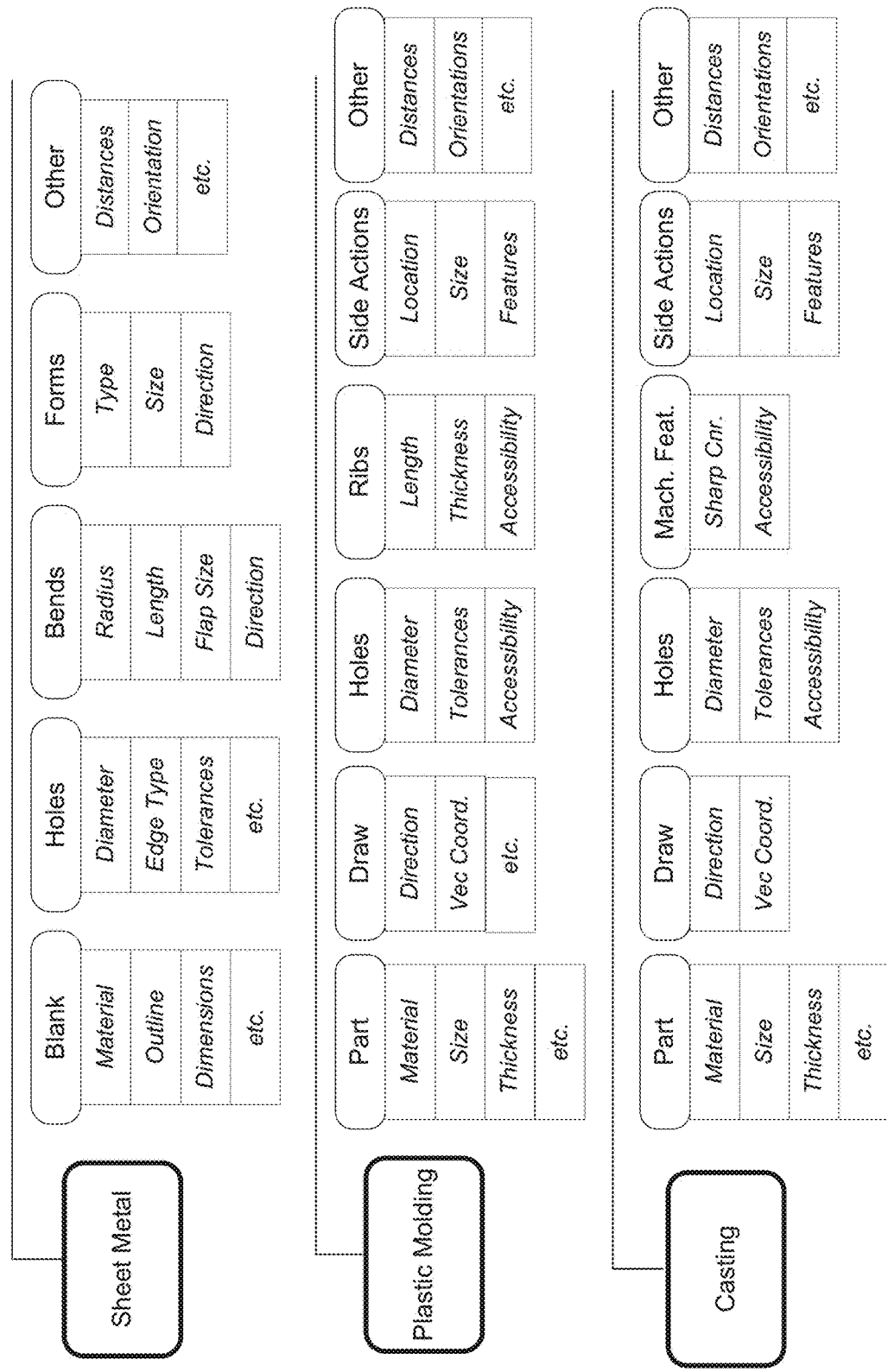

FIGS. 2A and 2B illustrate tables 200A-200B of features 204 driving complexity of manufacturing design based on process types 202 in accordance with an example embodiment. Referring to FIGS. 2A and 2B, different types of manufacturing processes 202 may have different features 204 (also referred to herein as drivers) that can create complexity and likewise reduce complexity. Some features 204 may be the same across each process type 202 while some features 204 may be unique to the particular process type. The geometry that the insight system (e.g., insight server 120 shown in FIG. 1, etc.) looks for may depend on the process type 202. Examples of process type 202 include sheet metal, plastic molding, casting, machining, bar and tube, assembly, and the like. More specific examples include, but are not limited to, soft-tool sheet metal processes, die stamping, sheet stretch forming, sheet hydroforming, plastic molding (injection, structural foam, reaction injection, etc.) rotational molding, blow molding, thermoforming, die casting, sand casting, forging, machines, additive manufacturing, powder metal, and the like. Each process type 202 may have a set of features 204 which are relevant to the manufacturing capabilities and complexities of the selected process type 202.

Examples of features 204 include, but are not limited to, blanks, holes, surfaces, parts, bends, draws, side actions, ribs, forms, machined features, and the like. Each feature 204 has various properties 206. In some cases, the properties 206 may overlap within some of the features 204. Properties 206 may include, but are not limited to, dimensions (or other size-related properties), edge type, tolerances, thickness, accessibility of tools/directions, location, distances, orientations, and the like. Some geometry is similar and carries the same label across each process type 202. For example, each process type 202 may have multiple types of holes. However, algorithms used to calculate and evaluate cycle times for manufacturing the holes may be different across each process type 202. In these examples, the insight system may generate and display a tree structure based on a number of unique features 204 that the system identifies for a component design. As a non-limiting example, the total number of features 204 possible for a sheet metal component may be 17, while a drawing may include a component in which 5 of the 17 features are identified.

Figure 3:
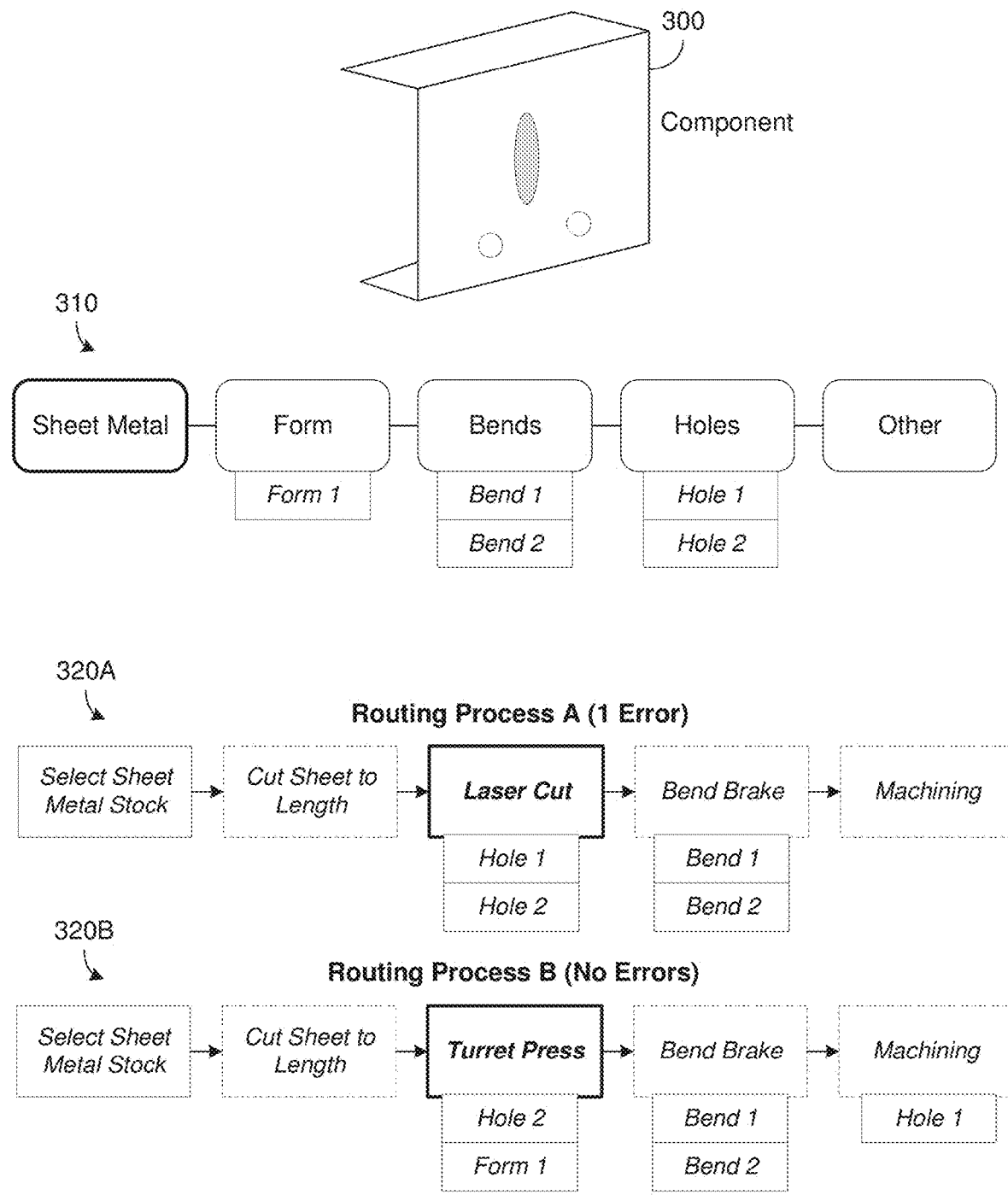
FIG. 3 is a diagram illustrating a process of determining a manufacturing design for a component in accordance with an example embodiment.

FIG. 3 illustrates a process 300 of determining a manufacturing design for a component in accordance with an example embodiment. Referring to FIG. 3, in step 310, the insight system identifies a number of features included in a geometric design of a sheet metal component 300 to be manufactured which may be included in a graphical model (CAD model, etc.) received by the system. In this example, the system identifies five features that might be modifiable. For example, the five features include a form, two types of bends, and two holes which may be automatically identified by the system based on a geometric design of the sheet metal component 300 (or drawing thereof) and may be further analyzed to determine if a modification is possible to any of the features to reduce manufacturing complexity.

In the example of FIG. 3, the system identifies multiple routes 320A and 320B for manufacturing the sheet metal component 300 and identifies the complexities of both routes. In particular, a first manufacturing route 320A will apply a laser cut to manufacture the component 300 while a second manufacturing route 320B will apply a turret press to manufacture the component 300. Each complete process route is shown with solid lines indicating required processes while dashed lines are optional.

In this example, the system determines that the laser cut process route 320A cannot manufacture a form of the component 300 because it has no process that can create the form feature, however the turret press process route 320B can create the form feature. Further, both process routes 320A and 320B have optional bend brake processes capable of designing the two types of bends.

In addition to modeling the individual processes of each route 320A and 320B, the system may model the achievable tolerances for geometry in each process. In this example, a diametric tolerance of the first hole may be 0.07 mm. It turns out that this tolerance can be manufactured by the laser cut process within route 320A, but cannot be manufactured by the turret press process in route 320B. In this case, the system also identifies that a secondary (optional) machining operation of the route 320B of the turret press can manufacture the hole to the right tolerance.

In this example, because the laser cut process route 320A has an error in that the form cannot be manufactured, the system may choose the turret press process route 320B because it has the highest confidence of a successful manufacture. However, if both process routings had an equal number of errors (or no errors) the system may choose a routing based on a second factor such as cost, time, availability, and the like.

FIG. 4 illustrates a user interface 400 displaying manufacturing attributes of a component in accordance with an example embodiment, and FIG. 5 illustrates a user interface 500 displaying suggested corrections or other modifications for designing a component in accordance with an example embodiment. The user interfaces 400 and 500 may be implemented together or separately. Also, the user interfaces 400 and 500 may be displayed via computing screen such as a designer's screen during a component design process. The user interfaces 400 and 500 may be output by a software described herein which is executed by a user device, a server, a cloud platform, or the like. Referring to FIG. 4, the user interface 400 illustrates examples of costs based on category of manufacture 410. In this case, the costs are broken down into material, labor, overhead, setup, investment, and "other." As another example, the costs may be displayed based on process type as shown in cost by process 420.

The user interface 400 also includes a fabrication issues window 430 which identifies any issues that may be relevant to manufacturing complexity. The cost information and the fabrication issues may be identified by the system from the initially submitted model (and any other additional inputs provided by the designer) during an initial input phase. In this non-limiting example, the issues are identified based on holes, bends, forms, materials, and proximity issues. In this example, the fabrication issues 430 identify a bend issue and five proximity issues. A user may make a selection on any of the buttons to drill-down into the issues and reveal more information about the issues and reveal suggestions about how to address the issues.

Referring to the user interface 500 of FIG. 5, the user may drill down into a bend issue 510 which can cause the system to identify an issue identified from the geometric design of the component, an label of the geometric feature (e.g., straight bend), the current amount of bend, and the suggested amount of bend. In this case, the suggested amount of bend may reduce the complexity of manufacture, for example, by removing a specialized tool, reducing a number of tools, reducing an amount of time, and the like, while still achieving the needed objective of the component. The user may also drill down into proximity issues 520 which identify two geometric features per issue, and a proximity between the two features that is creating unnecessary complexity. In this case, the two geometric features can be identified by a predetermined name (hole, blank, bend, etc.) and a current distance between the two features can be provided along with a suggested correction to the distance. Furthermore, the user may drill down into tolerance issues 530 that indicate certain thresholds where a specialized machining process is needed but which can be backed-off to eliminate the specialized machining for a basic machining process. In this example, a tolerance of the diameter of a hole is requiring specialized machining and can be backed off to create basic machining and reduce complexity.

Figure 6:
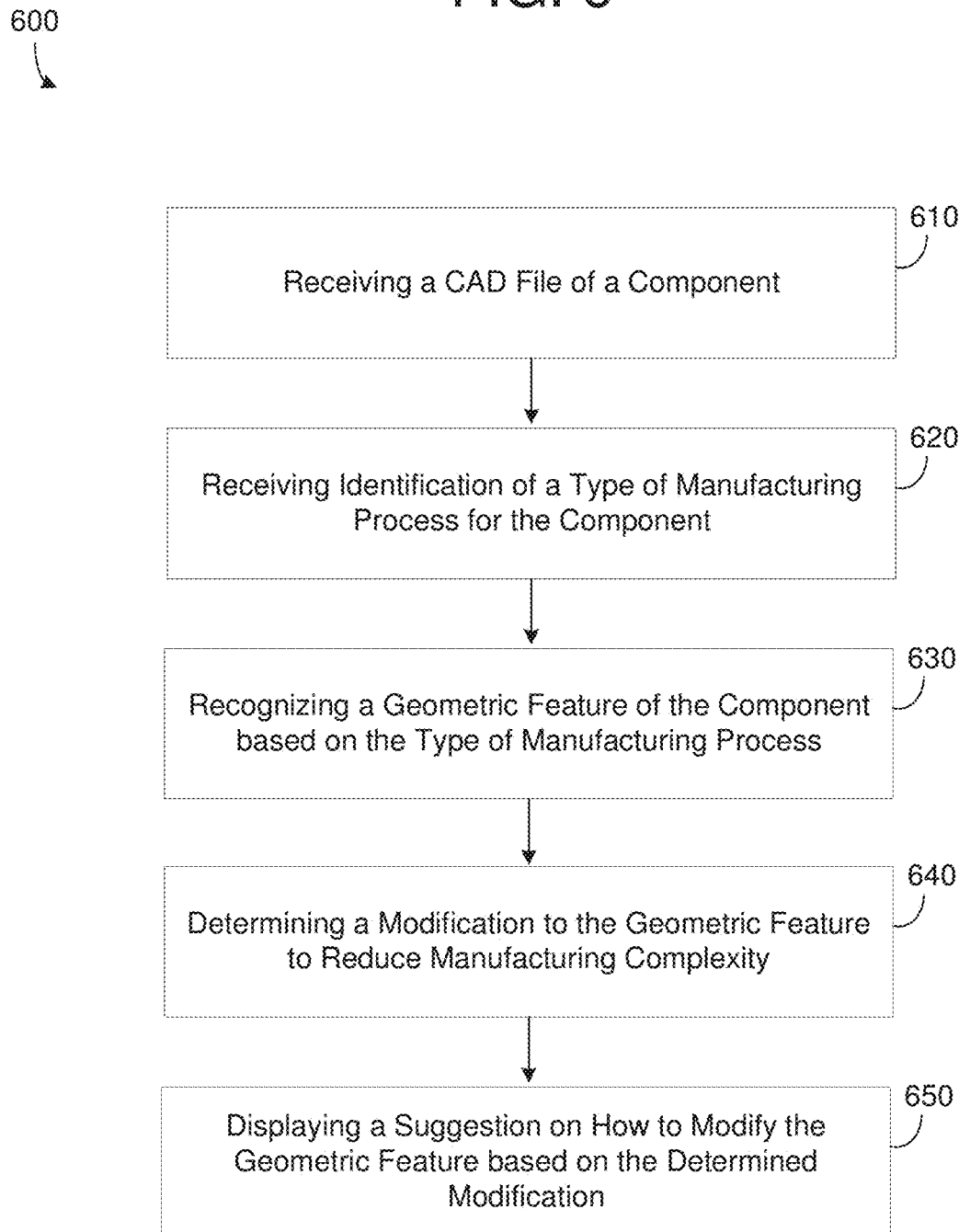
FIG. 6 is a diagram illustrating a method for generating suggested design modifications for manufacturing a component in accordance with an example embodiment.

FIG. 6 illustrates a method 600 for generating suggested design modifications for manufacturing a component in accordance with an example embodiment. As an example, the method 600 may be performed by a server, a user device, a cloud platform, or other computing system or combination of systems. Referring to FIG. 6, in 610, the method may include receiving an image including a geometric design of a component. As an example, the image may include a model created with the use of computer software such as an electronic design automation (EDA), computer-aided design (CAD), assembly bill of materials (BOMs), purchased parts lists, composite ply layup tables, or the like. The image may include a two-dimensional model a three-dimensional model of a component such as a part, a piece, an assembly of parts/pieces, or the like, which is to be manufactured via a machining process, a cutting process, a punching process, a casting process, and/or the like.

In 620, the method may include receiving an identification of a type of manufacturing process for the component from among a plurality of types of manufacturing processes. Here, the type of process may include a sheet metal process, a plastic molding process, a casting process, an assembly process, or the like. The type may be selected or otherwise input via a user interface. Different manufacturing processes may create different complexities which are distinct from the other processes. Complexity drivers may be used to identify which attributes of the type of manufacturing process affect manufacturing.

In 630, the method may include recognizing a geometric feature of the component from the image based on the type of manufacturing process. For example, the geometric feature may be detected via recognition system that identifies one or more geometries of interest from a CAD model such as a hole, a bend, a surface, a cut, a tab, a depression, and/or the like. The geometric feature may be identified based on geometric properties within the CAD model. The geometric properties within the CAD model may include mathematical definitions of surfaces, volumes, etc., such as a sharp corner, a rounded edge, a circle, a distance between two parts, a shape, a size, and the like.

In 640, the method may include determining a suggested modification to one or more of a size, a shape, and a location of the recognized geometric feature for reducing manufacturing complexity. Here, the suggestion may be determined to reduce manufacturing cost, increase manufacturing efficiency, reduce manufacturing time, and the like. For example, the suggestion may be determined based on a type of tool used to create the recognized geometric feature. As another example, the suggestion may be determined based on a number of tools used to create the recognized geometric feature. As another example, the suggestion may be determined based on a tolerance of the recognized geometric feature. As another example, the suggestion may be determined based on a material of the recognized geometric feature. As another example, the suggestion may be determined based on an amount of time predicted to manufacture the recognized geometric feature.

In 650, the method may include displaying, via a user interface, a suggestion on how to modify the geometric design of the component based on the determined suggestion of the recognized geometric feature. For example, the suggestion that is output on the user interface may include a suggestion on changing a size, a shape, a depth, a location, a material, and the like, of the geometric feature. As an example, the suggestion may include moving a hole to be drilled to a different position on the component to change a drilling operation from specialized to basic. As another example, the suggestion may include changing a bend from a rounded edge to a straight edge to enable manufacturing on a press-brake instead of a forming process, etc. It should be appreciated that many different suggestions can be made. Furthermore, the process may be iteratively repeated to enhance the design, for example until a threshold of complexity, efficiency, or the like, is achieved.

Figure 7:
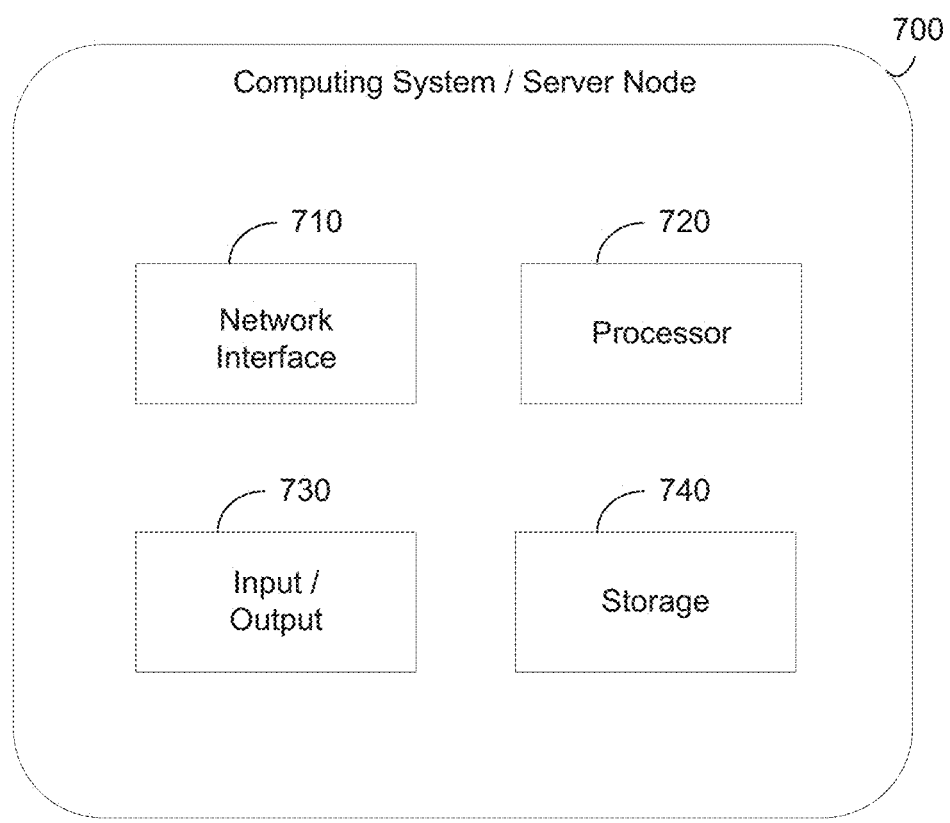
FIG. 7 is a diagram illustrating a computing system in accordance with an example embodiment.

FIG. 7 illustrates a computing system 700 that can perform an object copy operation, in accordance with an example embodiment. For example, the computing system 700 may be a database node, a server, a cloud platform, a user device, or the like. In some embodiments, the computing system 700 may be distributed across multiple devices. Referring to FIG. 7, the computing system 700 includes a network interface 710, a processor 720, an output 730, and a storage device 740 such as an in-memory. Although not shown in FIG. 7, the computing system 700 may also include or be electronically connected to other components such as a display, an input unit, a receiver, a transmitter, a persistent disk, and the like. The processor 720 may control the other components of the computing system 700.

The network interface 710 may transmit and receive data over a network such as the Internet, a private network, a public network, an enterprise network, and the like. The network interface 710 may be a wireless interface, a wired interface, or a combination thereof. The processor 720 may include one or more processing devices each including one or more processing cores. In some examples, the processor 720 is a multicore processor or a plurality of multicore processors. Also, the processor 720 may be fixed or it may be reconfigurable.

The output 730 may output data to an embedded display of the computing system 1000, an externally connected display, a display connected to the cloud, another device, and the like. For example, the output 730 may include a port, an interface, a cable, a wire, a board, and/or the like, with input/output capabilities. The network interface 710, the output 730, or a combination thereof, may interact with applications executing on other devices. The storage device 740 is not limited to a particular storage device and may include any known memory device such as RAM, ROM, hard disk, and the like, and may or may not be included within the cloud environment. The storage 740 may store software modules or other instructions which can be executed by the processor 720 to perform the method 600 shown in FIG. 6.

According to various embodiments, the processor 720 may receive an image including a geometric design of a component. The image may include a technical model such as CAD, or the like. The processor 720 may receive an identification of a type of manufacturing process for the component from among a plurality of types of manufacturing processes. The types may include a plastic molding process, a sheet metal process, a casting process, and the like. The processor 720 may recognize a geometric feature of the component from the image based on the type of manufacturing process, and determine a suggested modification to one or more of a size, a shape, and a location of the recognized geometric feature to reduce manufacturing complexity. The geometric feature may be represented from a geometric boundary representation of the component/part within the input model. Furthermore, the output 730 may output, to a user interface, a suggestion on how to modify the geometric design of the component based on the determined modification of the recognized geometric feature.

In some embodiments, the processor 720 may recognize one or more of a bend, a corner, a hole, and a surface of the component from the image based on geometric lines, breaks, shapes, holes, and the like, included in the drawing. The processor 720 may determine the correction based on one or more of a type of tool used to create the recognized geometric feature, a number of tools used to create the recognized geometric feature, a tolerance of the recognized geometric feature, a material of the recognized geometric feature, an amount of time predicted to manufacture the recognized geometric feature, and the like. The processor may automatically detect one or more different tools to be used. In some cases, the user may provide a type of tool that they desire to use with the drawing, and the processor 720 may detect one or more other tools that can be used instead, or in addition to help improve complexity.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
   a processor configured to
   receive a computer-aided design (CAD) file including an image of a geometric design of a component stored therein,
   receive an identification of a type of manufacturing process for the component from among a plurality of types of manufacturing processes,
   detect a modifiable geometric feature of the component from within the image of the CAD file based on geometric boundaries of the geometric design extracted from the CAD file,
   simulate a plurality of alternative manufacturing route sequences for manufacturing the component based on the modifiable geometric feature detected from the CAD file and the type of manufacturing process for the component, and label any errors that occur during the simulations of the plurality of alternative manufacturing route sequences;
   identify which alternative simulated manufacturing route sequences from among the plurality of alternative simulated manufacturing route sequences have no errors occur during simulation;
   select an alternative simulated manufacturing route sequence from among the identified alternative simulated manufacturing route sequences with no errors based on simulated costs of the identified alternative simulated manufacturing route sequences with no errors;

determine a modification to one or more of a size, a shape, a material, and a location of the detected modifiable geometric feature that reduces one or more of physical materials to be used, tooling to be used, and time required, for manufacturing the component based on the selected alternative simulated manufacturing route sequence, display, via a user interface, current structural characteristics of the geometric design of the component and suggested modified structural characteristics of the determined, and transmit the suggested modified structural characteristic of the determined modification to a manufacturing system that manufactures the component.

2. The computing system of claim 1, wherein the image comprises a part for machine manufacture.

3. The computing system of claim 1, wherein the plurality of types of manufacturing processes comprise a plastic molding process, a sheet metal process, and a casting process.

4. The computing system of claim 1, wherein the processor is configured to recognize one or more of a bend, a corner, a hole, and a surface of the component from the image.

5. The computing system of claim 1, wherein the processor is further configured to determine the modification based on a type of tool used to create the detected modifiable geometric feature.

6. The computing system of claim 1, wherein the processor is configured to determine the modification to reduce the number of tools used to create the detected modifiable geometric feature via the type of manufacturing process.

7. The computing system of claim 1, wherein the processor is configured to determine the modification to reduce a tolerance requirement of the detected modifiable geometric feature.

8. The computing system of claim 1, wherein the processor is configured to determine the modification to reduce the physical material of the detected modifiable geometric feature.

9. The computing system of claim 1, wherein the processor is configured to determine the modification to reduce time predicted to manufacture the detected modifiable geometric feature.

10. A method comprising:
receiving a computer-aided design (CAD) file including an image of a geometric design of a component stored therein;
receiving an identification of a type of manufacturing process for the component from among a plurality of types of manufacturing processes;
detecting a modifiable geometric feature of the component from within the image of the CAD file based on geometric boundaries of the geometric design extracted from the CAD file;
simulating a plurality of alternative manufacturing route sequences for manufacturing the component based on the modifiable geometric feature detected from the CAD file and the type of manufacturing process for the component and labeling any errors that occur during the simulations of the plurality of alternative manufacturing route sequences;
identifying which alternative simulated manufacturing route sequences from among the plurality of alternative simulated manufacturing route sequences have no errors occur during simulation;
selecting an alternative simulated manufacturing route sequence from among the identified alternative simulated manufacturing route sequences with no errors based on simulated costs of the identified alternative simulated manufacturing route sequences with no errors;
determining a modification to one or more of a size, a shape, a material, and a location of the detected modifiable geometric feature that reduces one or more of physical materials to be used, tooling to be used, and time required, for manufacturing the component based on the selected alternative simulated manufacturing route sequence;
displaying, via a user interface, current structural characteristics of the geometric design of the component and suggested modified structural characteristics of the determined; and
transmitting the suggested modified structural characteristic of the determined modification to a manufacturing system that manufactures the component.

11. The method of claim 10, wherein the image comprises a part for machine manufacture.

12. The method of claim 10, wherein the plurality of types of manufacturing processes comprise a plastic molding process, a sheet metal process, and a casting process.

13. The method of claim 10, wherein the recognizing comprises recognizing one or more of a bend, a corner, a hole, and a surface of the component from the image.

14. The method of claim 10, wherein the determining of the modification to one or more of the size, the shape and the location of the detected modifiable geometric feature is based on a type of tool used to create the detected modifiable geometric feature.

15. The method of claim 10, wherein the determining of the modification to one or more of the size, the shape, and the location of the detected modifiable geometric feature reduces a number of tools used to create the detected modifiable geometric feature via the type of manufacturing process.

16. The method of claim 10, wherein the determining of the modification to one or more of the size, the shape, and the location of the detected modifiable geometric feature reduces a tolerance requirement of the detected modifiable geometric feature.

17. The method of claim 10, wherein the determining of the modification to one or more of the size, the shape, and the location of the detected modifiable geometric feature reduces the physical material of the detected modifiable geometric feature.

18. The method of claim 10, wherein the determining of the modification to one or more of the size, the shape, and the location of the detected modifiable geometric feature reduces the time predicted to manufacture the detected modifiable geometric feature.

19. A non-transitory computer-readable storage medium storing program instructions that when executed cause a processor to perform a method comprising:
receiving a computer-aided design (CAD) file including an image of a geometric design of a component stored therein;
receiving an identification of a type of manufacturing process for the component from among a plurality of types of manufacturing processes;

detecting a modifiable geometric feature of the component from within the image of the CAD file based on geometric boundaries of the geometric design extracted from the CAD file;

simulating a plurality of alternative manufacturing route sequences for manufacturing the component based on the modifiable geometric feature detected from the CAD file and the type of manufacturing process for the component and labeling any errors that occur during the simulations of the plurality of alternative manufacturing route sequences;

identifying which alternative simulated manufacturing route sequences from among the plurality of alternative simulated manufacturing route sequences have no errors occur during simulation;

selecting an alternative simulated manufacturing route sequence from among the identified alternative simulated manufacturing route sequences with no errors based on simulated costs of the identified alternative simulated manufacturing route sequences with no errors;

determining a modification to one or more of a size, a shape, a material, and a location of the detected modifiable geometric feature that reduces one or more of physical materials to be used, tooling to be used, and time required, for manufacturing the component based on the selected alternative simulated manufacturing route sequence;

displaying, via a user interface, current structural characteristics of the geometric design of the component and suggested modified structural characteristics of the determined; and transmitting the suggested modified structural characteristic of the determined modification to a manufacturing system that manufactures the component.

20. The computing system of claim 1, wherein the received image comprises tolerance information about the detected modifiable geometric feature, and the determining the modification comprises determining to modify one or more of the shape and the size of the detected modifiable geometric feature to back-off a tolerance value included in the tolerance information of the CAD.

* * * * *